July 12, 1960  E. F. CONWAY ET AL  2,944,538
LUBRICATION SYSTEM FOR CHAIN SAWS
Filed Oct. 18, 1956  2 Sheets-Sheet 1

Inventors
EDWARD F. CONWAY
RUBEN W. PUTA

By Hill, Sherman, Meroni, Gross + Simpson Attys

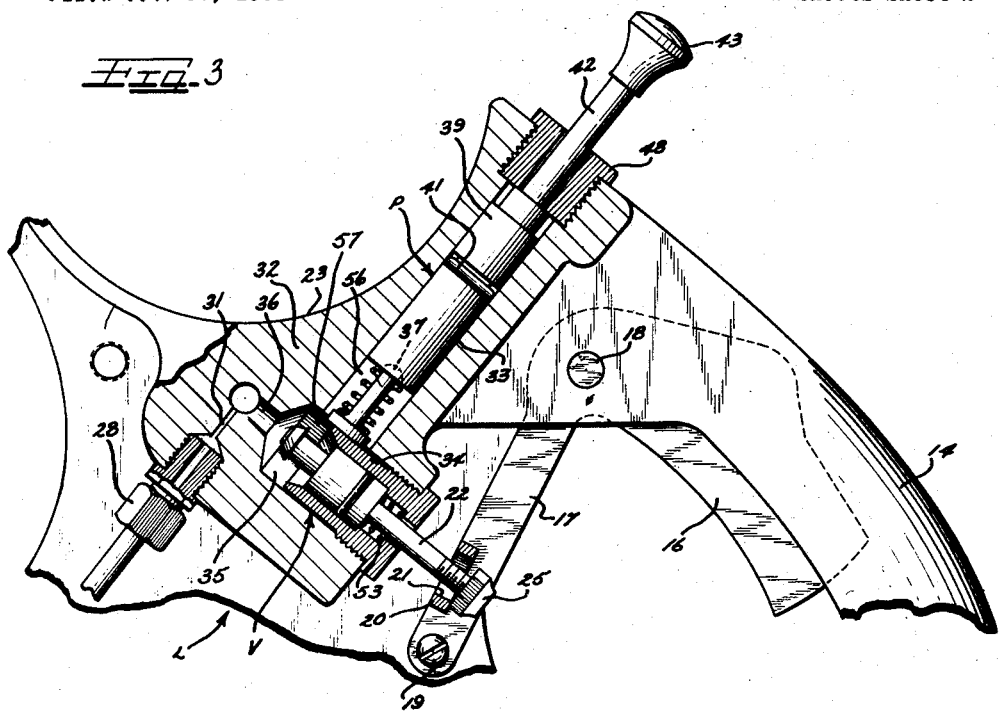
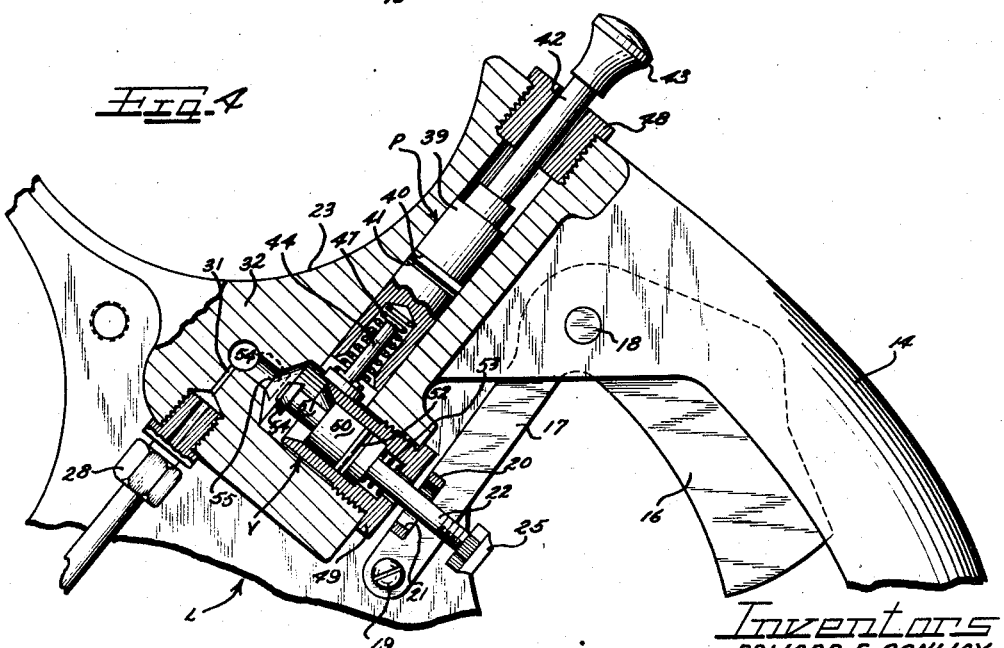

United States Patent Office 2,944,538
Patented July 12, 1960

2,944,538
LUBRICATION SYSTEM FOR CHAIN SAWS

Edward F. Conway, Arlington Heights, Ill., and Ruben W. Puta, Winona Lake, Ind., assignors to Magnaflux Corporation, Chicago, Ill., a corporation of Delaware Filed Oct. 18, 1956, Ser. No. 616,711

2 Claims. (Cl. 123—196)

This invention relates to a lubrication system, and more particularly relates to a lubricating system for a power driven chain saw, or the like, that will provide a flow of lubricant to the saw, when the saw is cutting, and wherein provision is made for selectively increasing the lubricant flow pressure to clear the system of foreign particles.

In the past, lubrication for the saw bars on power driven chain saws was effected either by a manually operated pump or by an automatic low pressure oiling system, which either depending upon a low pressure pump or engine crank case pressure to force the oil onto the saw bar. Either of these systems is subject to several disadvantages. Namely, in the case of the low pressure automatic system, the flow of lubricant to the saw became throttled if not completely shut off due to the accumulation of sawdust and dirt particles in the lubricant passages, and in the case of the manually operated system, the operator was prone to overlook a periodic manipulation of the pump at the prescribed time intervals, such that the saw was frequently operated without proper lubrication and damage resulted to the saw.

The present invention offers one solution to this problem in the form of a combined manual and automatically activated lubrication system for a chain saw, that will assure an adequate flow of lubricant to the saw during operation and requires a minimum of attentive effort by the operator when the saw is in use, and then only to operate the manual system to periodically clear the lubricant passages from sawdust or other foreign particles, thereby minimizing the danger of possible damage to the unit and simplifying its operation.

Briefly described, the present invention contemplates a combined high-pressure manually operated plunger type pump lubrication system and a low-pressure automatically activated lubrication system wherein crankcase bleed pressure provides the force necessary to cause lubricant to flow from a lubricant reservoir to a point of utilization on a chain saw when the saw chain is in operation. The low-pressure automatic lubrication system is activated in response to a predetermined throttle position at which point a driving engagement also occurs to deliver power to the saw chain. The high-pressure pump lubrication system, is selectively activated by the operator at any time by a manual depression of the pump plunger.

In order to maintain a flow of lubricant from the lubricant reservoir when the chain is inclined so as would interrupt the normal gravity feed flow, provision is made for pressurizing the lubricant reservoir by a low-pressure conduit which bleeds from the engine crankcase.

It is an object then of the present invention to provide an improved combination automatic and manually operated lubrication system for a power driven chain saw, and the like.

Another object of the present invention is to provide an improved lubrication system for a power driven chain saw, and the like, that incorporates a combined full time low-pressure and gravity feed lubrication system in conjunction with a high-pressure selectively activated manual lubrication system, to minimize the attentive effort required of an operator when the saw is in use.

A still further object of the present invention is to provide a combined automatic and manually operated lubrication system for a device requiring continuous lubrication in use that will minimize the danger of damage to the device, by providing a combined full time low-pressure and gravity feed system in conjunction with a selective operation of a manual high-pressure pump system, such that adequate lubrication is assured at all times throughout a variety of work positions during the operating cycle of the device.

Another object of the present invention is to provide an improved lubrication system for a power driven chain saw, and the like, that will maintain an adequate flow of lubricant to the saw chain while being operated, and that will clear the lubricant passages from natural clogging after repeated usage.

A still further object of the present invention is to provide an improved combination automatic low-pressure gravity feed and lubrication system in conjunction with a selectively activated high-pressure lubrication system for a power driven chain saw, and the like, that eliminates the disadvantages of the conventional low-pressure gravitational feed system or manually operated high-pressure system, individually.

Another object of the present invention is to provide an improved combination automatic and manually operated lubrication system for a chain saw, and the like, that is simple in operation, easy to maintain, and requires little maintenance.

Many other objects and advantages of the present invention will become manifest to those versed in the art upon making reference to the accompanying sheets of drawings and detailed description which follows, that form a part of this specification.

Figure 3 is a side cross-sectional view, with some parts in section and some parts in elevation, of the manually operated pump and plug valve assembly of the lubrication system of the present invention, illustrating the respective positions of the parts when the lubrication system is functioning only as an automatic low-pressure gravity feed system; and Figure 4 is a view similar to Figure 3, but showing the relative position of the parts of the lubrication system of the present invention, when the piston assembly of the high-pressure manually operated pump has been depressed to its fully extended position.

Figure 1:
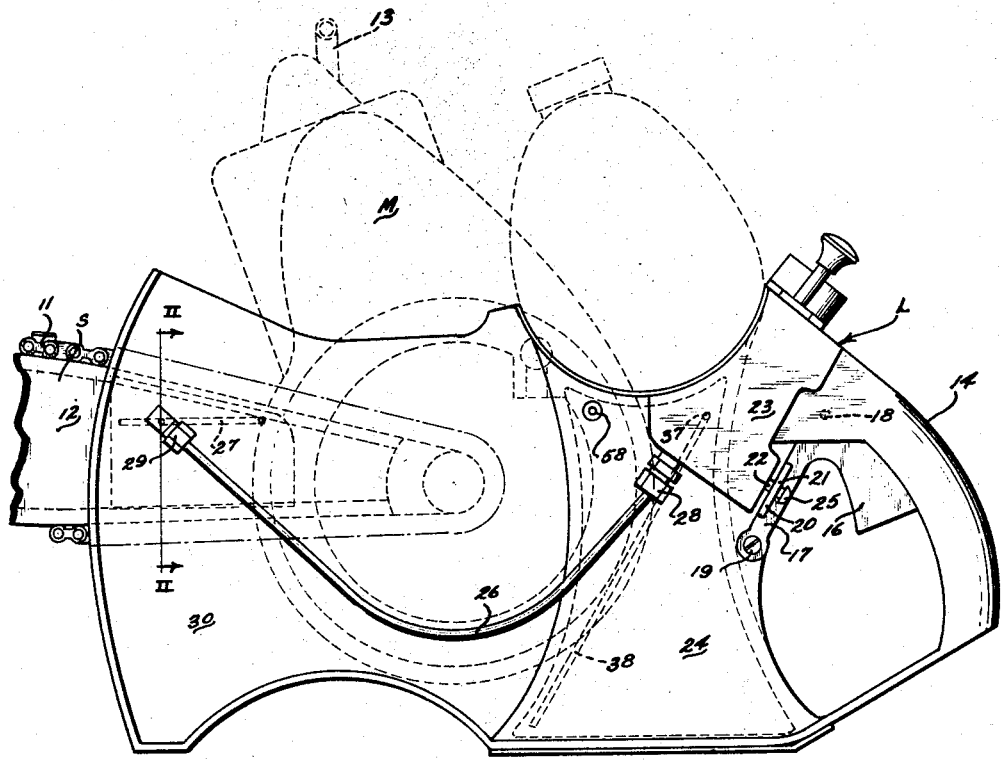
Figure 1 is a reduced fragmentary side view, with some parts in elevation and some parts in phantom, showing the lubrication system of the present invention incorporated in a typical power driven chain saw.

As shown on the drawings:

In Figure 1, a typical power driven chain saw assembly 10 is illustrated, comprising a motor assembly M, an endless saw chain and cutter bar assembly S, and the lubrication system L of the present invention. The motor assembly M may be of any suitable type, but is preferably of a light weight two-cycle gasoline engine, that utilizes a fuel-lubrication system and manual rope pull starter. The chain saw assemblies may similarly be of any conventional type and includes an endless cutting chain 11 that is supported in an elongated grooved blade 12. Power may be transmitted to the chain 11, as for example, through a sprocket drive (not shown), and clutch assembly (also not shown).

The chain saw assembly 10 is provided with a supporting tubular frame 13, that is generally positioned around the motor assembly M, and a pistol grip handle assembly 14, adjacent the lubrication system L. The handle assembly 14 includes a pivotally mounted trigger 16, that is formed with a depending arm 17, and is connected to the handle 14 for pivotal movement about a point 18.

The arm portion 17 of the trigger 16, includes a throttle control fastener 19 at its end extremity, as for example, a collar and set screw, and also includes a centrally flanged portion 20 that is appropriately bored as at 21 (Figures 3 and 4) to permit engagement with the externally depending portion of a plunger shaft 22 on the lubrication system L.

Figure 2:
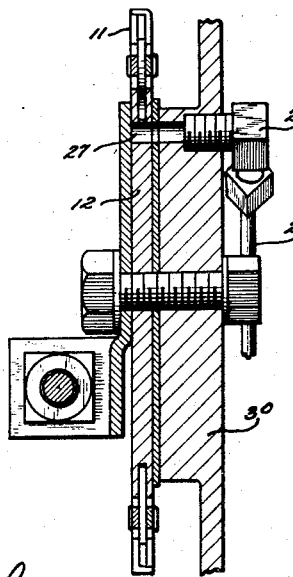
Figure 2 is a fragmentary front cross-sectional view, substantially along the lines II—II, of Figure 1.

The lubrication system L for the chain saw assembly 10 includes a plug valve and pump assembly 23, a lubricant reservoir 24 and a feed line 26, that directs a flow of lubricant from the plug valve and pump assembly 23 to a lubricant groove 27 in the saw blade 12 (Figure 2). The lubricant groove 27 is so oriented in relation to the lubricant reservoir 24 and plug valve and pump assembly 23 that when the saw assembly 10 is in a normal operating position, lubricant from the plug valve and pump assembly 23 will fill the oil groove 27 and through the combined action of gravity, capillary attraction and crankcase pressure from the motor assembly M, will thereafter flow onto the saw chain 11. Suitable fittings 28 and 29, on the plug valve and pump assembly 23, and a blade support housing 30, respectively, connect the lubricant feed line 26 between each of these components.

Thus it will be appreciated that when the chain saw assembly 10 is in the position indicated in Figure 1, or is inclined toward the horizontal, such that the lubricant groove 27 is below the level of lubricant in the reservoir 24, a natural gravity feed condition will prevail in addition to the flow induced by crankcase pressure from the motor assembly M, as will be explained in more detail later.

Referring now more particularly to Figures 3 and 4 in conjunction with Figure 1, the lubrication system L of the present invention is comprised generally of a manually operated pump assembly P, an automatically activated plug valve assembly V, and a metering orifice 31, between the plug valve and pump assembly 23, adjacent the fitting 28.

The plug valve and pump assembly 23 may be formed for example, in a generally solid block body portion 32 that is bored as at 33 and 34 to receive the pump assembly P, and plug valve assembly V, respectively. The bores 33 and 34 intersect each other in the body portion 32 to form a lubricant chamber 35 for the lubrication system L, and a bore 36 forms a communicating passage with the metering orifice 31 and lubricant feed line 26. A passage 37 (Figure 3) intersects the bore 33 at a point substantially adjacent its point of intersection with the bore 34, to form an inlet port for lubricant being supplied to the lubricant chamber 35, before passing through the metering orifice 31 and feed line 26.

As best shown in Figure 4, the manually operated pump assembly P may include for example, a hollow sleeve-type piston 39, that is circumferentially grooved as at 40 to receive an annular seal 41, a connecting plunger shaft 42 and operating knob 43, and a pilot post 44 to maintain a spring 46 seated in an axial counterbore 47 of the piston 39. A piston retainer fitting is threaded into the bore 33 and serves to journal the plunger shaft 42 during reciprocal movement of the pump assembly P in the bore 33.

Thus it will be appreciated that the pilot post 44 and spring 46 cooperatively seat in the axial counterbore 47 of the piston 39, and serve to normally bias the piston assembly P into the fully retracted position shown in Figure 3.

The plug valve assembly V is comprised generally of a plunger housing 49, that reciprocally receives a slidable piston 50 and inner plunger shaft 51. The slidable piston 50 is circumferentially grooved to receive an annular seal 52. A coil spring 53 is positioned behind the piston 50 around the plunger shaft 22, and serves to urge the piston 50 and plunger shaft 51 out of the plunger housing 49 toward the passage 36 and metering orifice 31.

The end extremity of the inner plunger shaft 51 has a tapered valve plug 54 formed thereon, that is sized to close a valve port 55, formed by the passage 36 in the lubrication system body 32. The passage 36 in turn communicates with the metering orifice 31 to provide a flow passage for lubricant passing through the plug valve assembly V.

As indicated in Figures 3 and 4, the diameter of the valve port 55 is substantially less than the effective diameters of the piston 39 of the pump assembly P, and the piston 50 of the plug valve assembly V. The relative ratios between the areas of the pistons and valve port 55 and their relationship to the operation of the lubrication system L will become more apparent as the description progresses.

When the piston assembly P and plug valve assembly V are respectively positioned in the bores 33 and 34 of the lubrication system body 32 as illustrated in Figure 3, lubricant chambers 56 and 57 will be formed adjacent the piston assemblies 39 and 50, the chamber 56 being in hydraulic registry with the chamber 57, and both chambers forming the lubricant chamber 35.

Thus it will be appreciated that movement of the piston 39 from its retracted position illustrated in Figure 3, to some extended position, as illustrated in Figure 4, will immediately serve to increase the pressure of the lubricant in the chamber 35, and across the metering orifice 31.

Due to the large cross-sectional area of the piston 50, relative to the valve plug 54, increased pressure in the chamber 35 will cause the piston 50 and plunger shaft 51 to overcome the compression of the spring 53 and move downwardly in the plunger housing 49, thereby unseating the valve plug 54 and causing a pressurized flow of lubricant through the feed line 26 to the lubricant groove 27.

It should be noted that the pump assembly P may be activated at any stage of the operating cycle of the chain saw assembly 10, such as when the motor assembly M is idling, as where the saw is being shifted to another work position.

Referring now to Figure 1 in conjunction with Figures 3 and 4, the operation of a lubrication system L for the chain saw assembly 10 is as follows:

After all the preliminary adjustments have been made and the lubrication reservoir 24 has been filled with lubricant the motor M is started and set at an idle running condition. A check valve 58 (Figure 1), near the top of the lubricant reservoir 24, communicates crankcase bleed pressure from the motor assembly M to the lubricant reservoir 24. Lubricant will thus be urged up the tubular conduit 38 to the inlet port 37 (Figure 3), to fill the chamber 35.

When the motor M is idling, the throttle control trigger 16 and depending arm 17 will be substantially in a position shown in Figure 4, and the chain 11 will remain stationary in the blade 12. When the arm 17 is moved to the position shown in Figure 4, the plunger assembly P will be in the fully retracted position illustrated in Figure 3, and the piston 50 and inner plunger shaft 51 of the plug valve assembly V, will assume the dotted line position illustrated in Figure 4 under the influence of the spring 53. The valve plug 54 will thus be seated in the valve port 55, thereby shutting off all flow of lubricant from the chamber 57 to the metering orifice 31 and feed line 26.

Adjustment of the fastener 25 will control the extent to which the piston and plunger shaft of the plug valve assembly V will slidably move within the housing 49, to thus unseat the valve plug 54 and permit lubricant to flow through the metering orifice 31 to the feed line 26. Determination of this point is a matter of choice, but a preferable adjustment would be such as would provide engagement between the flanged portion 20 on the arm 17, and the fastener 25 at the point where the chain saw assembly S becomes drivingly engaged with the motor assembly M. After the saw assembly S has been operated for a period of time, sawdust and other foreign particles will accumulate in the saw teeth and lubricant groove 27, thereby interrupting the flow of lubricant in the low pressure gravity feed lubrication system, to the possible damage of the saw assembly S. To avoid this result, the operator need only depress the plunger button 43 to the position illustrated in Figure 4, thus causing the piston 39 and plunger shaft 42 of the pump P to move downwardly in the bore 33, thereby unseating the plug valve 54, due to the increased pressure in the lubricant chamber 57, and at the same time increasing the rate of flow of lubricant to lubricant groove 27. The increased pressure of lubricant in the chamber 57 will immediately be communicated through the feed line 26 to the lubricant groove 27, to expel any accumulated work particles or foreign matter and thus permit the lubrication system L to function under normal gravity and crank case bleed pressure conditions.

Upon releasing the plunger button 43, spring 46 will return the piston 39 and plunger shaft 42 of the pump assembly P to its retracted position illustrated in Figure 3, until it is necessary to clear the system again.

If the chain saw assembly 10 is being operated for the first time, or has remained idle for a considerable period, it is desirable for an operator to depress the plunger button 43 several times before the chain saw assembly S is connected in driving engagement with the motor M, thus assuring an adequate supply of lubricant in the lubricant groove 27 for the initial sawing operation.

Thus it will be appreciated that the lubrication system L for the chain saw assembly 10 presents a novel improved lubrication system combining automatic and manual operating features that will serve to maintain a supply of lubricating fluid to the chain, or other device requiring continuous lubrication under normal operating conditions, with a minimum or attentive effort and exertion on the part of the operator.

While only one embodiment of the present invention has been herein described, it should be understood that various modifications and variations may be effected without departing from the scope of the novel concepts herein disclosed.

We claim as our own invention:

1. An automatic lubrication system adapted for use with a power chain saw, and the like, utilizing a two-cycle internal combustion engine having a piston and cylinder assembly, a crankcase and an associated engine control means, said system comprising an associated housing having a lubricant chamber formed therein, a lubricant reservoir communicating with said lubricant chamber, said lubricant reservoir being subjected to crankcase bleed pressure generated by said internal combustion engine to provide a pressurized flow of lubricant into said lubricant chamber, a conduit between said lubrication chamber and a point of utilization on said saw directing a flow of pressurized lubricant therebetween, said housing also having a metering orifice formed therein between said lubrication chamber and said point of utilization, a valve in said housing selectively controlling the flow of lubricant to said point of utilization operatively connected to and responsive to predetermined positional changes of said engine control means, and a manually operated pump in said housing communicating with said lubrication chamber to pressurize said lubricant chamber and provide an additional pressurized flow of lubricant from said lubricant chamber to said point of utilization to supplement the flow of lubricant induced by crankcase bleed pressure in said reservoir, said valve having a piston connected therewith and subjected to pressure in said chamber and being unseated in response to the actuation of said manually operated pump, whereby the increased flow of lubricant attained by operation of said manually operated pump will clear said lubricant conduit of foreign matter and work particles to maintain a free flow of lubricant to the point of utilization.

2. In a motor driven chain saw assembly including an engine, speed control means for said engine including a control lever, a lubricant system comprising a housing having a lubricant chamber formed therein, means for supplying lubricant to said lubricant chamber, a passageway leading from said lubricant chamber to a point of utilization on said chain saw, a valve in said lubricant chamber controlling the flow of lubricant from said chamber to said passageway, means connecting said control lever to said valve to open said valve upon operation of said control lever, a spring biasing said valve in a closed position, a piston operatively connected with said valve for opening said valve by pressure within said lubricant chamber independently of said lever upon the building up of pressure in said lubricant chamber, a pumping chamber having communication with said lubricant chamber, a manually operable pump in said pumping chamber selectively operable to pressurize said lubricant chamber and supply pressure to said piston to open said valve and thereby accommodate said pump to force lubricant to the point of utilization.

References Cited in the file of this patent

UNITED STATES PATENTS

| | | |
|---|---|---|
| 1,024,862 | Moewes et al. | Apr. 30, 1912 |
| 1,574,410 | Powell | Feb. 23, 1926 |
| 2,109,702 | Lange | Mar. 1, 1938 |
| 2,391,730 | Melvin | Dec. 25, 1945 |
| 2,605,787 | Kiekhaefer | Aug. 5, 1952 |
| 2,650,626 | Kiekhaefer | Sept. 1, 1953 |
| 2,688,989 | Smith | Sept. 14, 1954 |
| 2,741,275 | Johnsen | Apr. 10, 1956 |
| 2,748,810 | Strunk | June 5, 1956 |

FOREIGN PATENTS

| | | |
|---|---|---|
| 1,047,905 | France | July 29, 1953 |